ANDRES O. HOLDO
INVENTOR.

ANDRES O. HOLDO
INVENTOR.

United States Patent Office 3,169,220
Patented Feb. 9, 1965

3,169,220
SIGNAL RATIO MEASURING SYSTEM PROVIDING CONSTANT SERVO LOOP GAIN
Andres O. Holdo, Pasadena, Calif., assignor to
F. L. Moseley Co., a corporation of California
Filed Dec. 21, 1959, Ser. No. 860,774
3 Claims. (Cl. 324—140)

This invention relates to electrical signal measuring systems and more particularly to a new and improved system for measuring the relative magnitudes of two electrical signals.

In the testing of electrical circuit components and in the monitoring of electrical signals, it is frequently desirable to derive an output indication of the ratio of the magnitudes of two separate signals. For example, in the measurement of transistor characteristics, it is frequently desirable to derive a signal representing beta, which may be defined as the ratio of the collector current to the base current. Similarly, the gain of an amplifier is defined as the ratio of the value of an output signal to the value of an input signal, and again it is desirable to provide a means for directly generating a signal corresponding to the ratio without the necessity for manual computation.

One problem encountered in systems employing closed servo loops, is that the overall gain of the servo loop may vary in accordance with the value of a signal applied to the input circuit so that the overall loop gain becomes a function of the value of the applied signal.

The present invention is directed to an arrangement for solving the problem set forth above and may be employed for the purpose of measuring the ratio between the magnitudes of two electrical signals as well as for controlling the gain of an element in a closed loop servo system in a predetermined fashion corresponding to the magnitude of an applied signal.

Accordingly, it is a primary object of the present invention to provide a new and improved ratio measuring servo system.

It is another object of the present invention to provide a new and improved servo system in which the gain of the system is varied in a predetermined functional relationship with respect to an applied signal.

It is yet another object of the present invention to provide a new and improved ratio meter.

It is still a further object of the present invention to provide a new and improved system for deriving an output indication directly representing the ratio of the magnitudes of two applied signals.

Briefly, in accordance with one aspect of the invention, a system is provided for measuring the relative magnitudes of two input signals in which a closed loop servo system maintains a condition of balance in an input circuit with the gain of an element contained within the servo loop being altered to maintain a predetermined overall servo loop gain substantially unaffected by the magnitude of the applied input signals. In a particular embodiment of the invention, a servo loop is employed in which a servo amplifier is connected to a gain control circuit within which the gain of the servo amplifier is altered as a function of an applied signal to maintain the overall servo loop gain constant.

In accordance with another aspect of the present invention, a new and improved ratio meter is provided in which an input circuit receives two separate electrical signals which are balanced against one another. In a condition of unbalance, an error signal is provided which is amplified by a servo amplifier whose gain is determined as in inverse function of one of the signals. The input circuit is rebalanced as a function of the output signal from the servo amplifier with an overall servo loop being formed having a gain which is substantially independent of the applied input voltages. An indicator is linked to the servo system from which the ratio between the applied electrical signals may be directly measured.

A better understanding of the present invention may be had from a reading of the following detailed description and an inspection of the drawings, in which.

Figure 1:
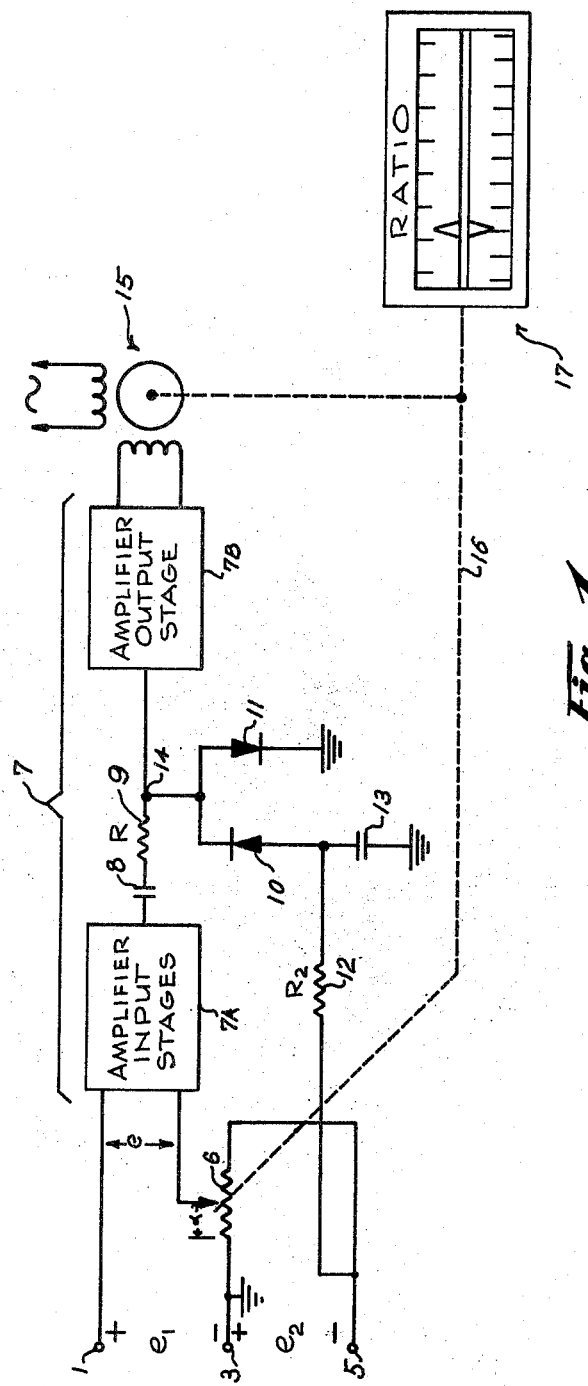
FIG. 1 is a simplified block and schematic diagram of a ratio measuring servo system in accordance with the invention.

In FIG. 1 there is illustrated a ratio measuring system in accordance with the invention in which a signal or voltage $e_1$ may be applied between a pair of input terminals 1 and 3 and a second signal or voltage $e_2$ may be applied between the input terminals 3 and 5. The voltage $e_2$ appears across a balancing element in the form of a potentiometer 6 having a movable contactor which is connected to a servo amplifier 7. Between the contactor and the terminal 1 there appears a voltage $e$, termed the error voltage, which is appied to the input stages 7A of the servo amplifier 7 and reflects a condition of balance or unbalance within the input circuit. In a condition of balance, the potentiometer contactor is adjusted until the voltage $e_1$ is substantially equal and opposite to a fractional part of the voltage $e_2$ appearing between the contactor and the lefthand end of the potentiometer resistance element.

The position of the contactor of the potentiometer 6 is measured as a function of its position and is designated by the symbol $\alpha$. When the input circuit is in a condition of balance, the error signal $e$ is substantially equal to zero and the servo amplifier 7 provides a substantially zero output signal. However, in a condition of unbalance, the error signal $e$ is passed and amplified by the servo amplifier input stages 7A to a gain control network via a coupling capacitor 8. The gain control network comprises a fixed impedance in the form of a resistor 9 which cooperates with a pair of serially connected diodes 10 and 11 to variably attenuate the output signal from the servo amplifier input stages 7A.

Between the input stages 7A and output stages 7B of the servo amplifier, the gain control network comprising the fixed impedance 9 and the variable impedances provided by the diodes 10 and 11 is connected. The diodes 10 and 11 are connected serially with a common junction point 14 being connected to receive the signal passed by the resistor 9. Furthermore, the signal $e_2$ applied to the terminals 3 and 5 is applied to the diodes 10 and 11 via a fixed resistor 12. A capacitor 13 functions to provide a low impedance path to ground for amplified signals passing through the diode 10.

The current flow through the diodes 10 and 11 is a function of the voltage $e_2$ and the impedance of the diodes varies as a function of the current flow therethrough so that the impedance from the junction point 14 to ground varies as a function of the voltage $e_2$. By this means, a signal passed by the resistor 9 is attenuated as a function of the input signal $e_2$ with the overall gain of the servo amplifier being altered inversely with respect to the magnitude of the voltage $e_2$.

The servo amplifier output stage 7B provides an output signal which is applied to one winding of a reversible two-phase motor 15. In accordance with common practice, one winding of the two-phase motor 15 receives an alternating current wave of fixed phase, while the servo amplifier output stage 7B provides an output signal of reversible phase and variable amplitude corresponding to the polarity and magnitude of the error voltage $e$ applied to the servo amplifier input stages 7A. In response to the signal from the servo amplifier output stages 7B, the reversible phase motor 15 turns in a direction determined by the phase relationship between the output signal and the fixed phase wave applied to the second winding.

The motor 15 may be mechanically linked to the potentiometer 6 by means of a suitable mechanical linkage indicated diagrammatically in FIG. 1 by means of the dashed line 16. As a result, the motor 15 rotates in response to the error signal $e$ to move the contactor of the potentiometer 6 in a direction which reduces the error voltage $e$ and restores a condition of balance within the input circuit. In a condition of balance, the position, $\alpha$, of the contactor of the potentiometer 6 corresponds to the ratio of the voltage $e_2$ to the voltage $e_1$. This ratio may be read directly in the arrangement of FIG. 1 by means of a suitable indicating scale 17 which is mechanically linked to the motor 15 and contactor of the potentiometer 6 by the mechanical linkage 16.

The manner in which the above system operates to provide an accurate measurement of the ratio of the magnitudes of applied input signals may be best understood by a consideration of the following relationships:

$$e = e_1 - \alpha e_2$$

where $e$ equals the error signal, $e_1$ equals one applied input signal, $e_2$ equals the other applied input signal, and $\alpha$ equals the position of the contactor of the potentiometer 6 given as a percentage of its travel along the length of the resistance element of the potentiometer 6. The above relationship obtains so long as a condition of balance exists in which the error signal $e$ is substantially equal to zero. Therefore, $$\alpha = \frac{e_1}{e_2}$$

The loop gain for a servo system with constant amplifier gain, K, is $$G = K \frac{de}{d\alpha} = K(-e_2)$$

To obtain constant loop gain we must have a variable amplifier gain $$K = \frac{K'}{e_2}$$

Therefore, the gain of the amplifier must be an inverse function of the input voltage, $e_2$, to maintain a constant servo loop gain. Where silicon diodes are employed for the diodes 10 and 11, a voltage level of one volt may be employed to establish an appropriate conduction level at which the relationship between the impedance of the diodes and the applied voltage is substantially linear. Accordingly, where $$e_2 \gg 1 \text{ volt}$$

the current, I, through the diodes of FIG. 1 is $$I \simeq \frac{e_2}{R_2}$$

where $R_2$ equals the value of the resistor 12. This relationship obtains since the impedance of the diodes 10 and 11 is relatively small compared to $R_2$. The equation for the impedance of one of the diodes is $$I = I_0 \left( e^{\frac{qv}{RT}} - 1 \right)$$

where $I_0$ equals the saturation current in the reverse direction of the diode. Therefore, $$\frac{I + I_0}{I_0} = e^{\frac{qv}{RT}} \quad \text{and} \quad \ln\left(\frac{I + I_0}{I_0}\right) = \frac{qv}{RT}$$

The dynamic impedance of the diodes $$Z' = \frac{dv}{dI}$$

If the current I is much greater than the saturation current $I_0$, $$Z' = \frac{RT}{q} \frac{1}{I + I_0} = \frac{K'''}{I}$$

Since $K'''$ is a constant, it is established that the impedance $Z'$ is an inverse function of the current I passed by the resistor 12. Furthermore, since the current I through the resistor 12 bears a direct relationship to the applied voltage $e_2$, the impedance is an inverse function of the magnitude of the voltage $e_2$. The result is that a variable impedance is presented to the signal passed by the resistor 9 in the arrangement of FIG. 1 as an inverse function of the applied voltage $e_2$ so as to alter the gain of the servo amplifier 7 and to establish a constant servo loop gain. Therefore, the arrangement of FIG. 1 functions as desired to measure the ratio between the voltages $e_1$ and $e_2$ irrespective of the magnitude of the voltages so long as the diodes 10 and 11 are maintained in a conductive condition under the influence of the applied voltage $e_2$.

Figure 2:
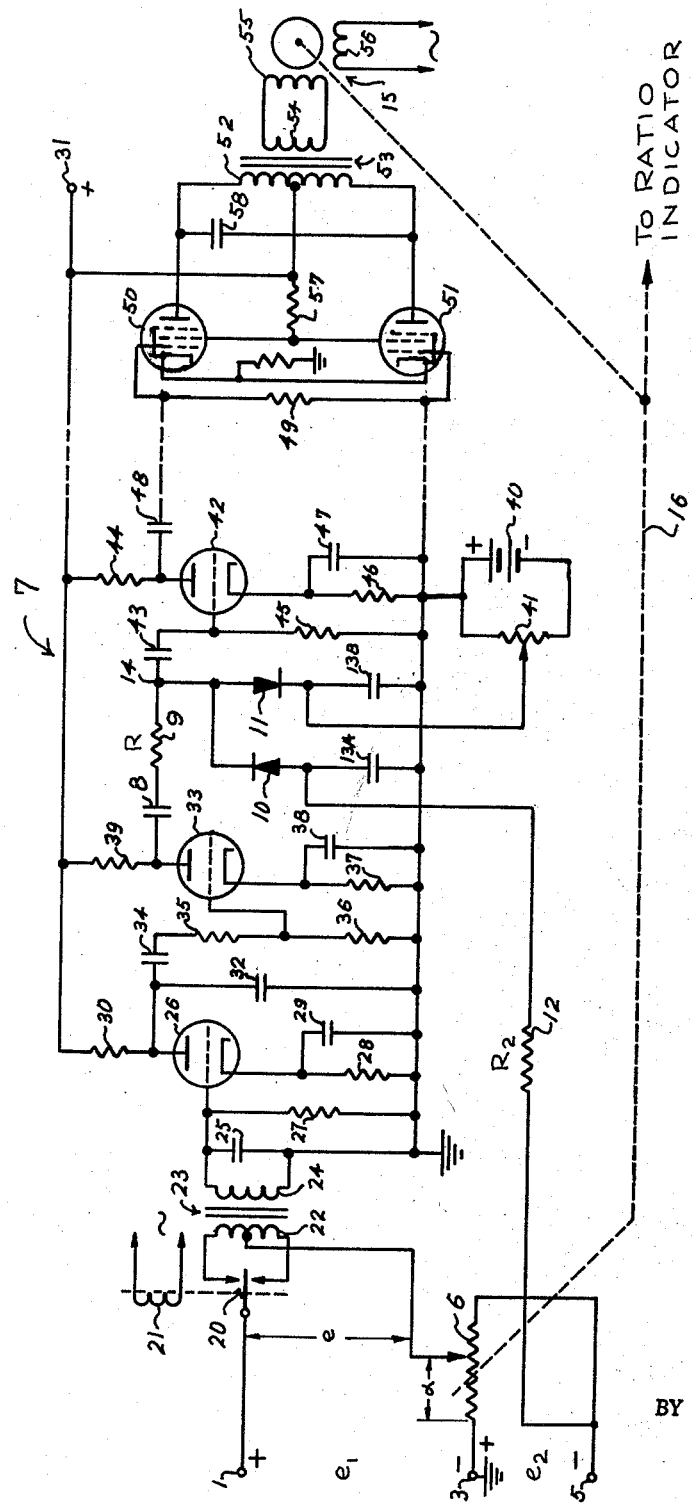
FIG. 2 is a schematic circuit diagram of one form of a ratio measuring system in accordance with the invention for performing the functions indicated by the diagrammatic illustration of FIG. 1.

FIG. 2 is a schematic circuit diagram of a portion of an arrangement corresponding to FIG. 1 illustrating the details of one suitable servo amplifier and gain control circuit arrangement for use in a ratio measuring instrument. In FIG. 2, similar reference characters have been employed to designate each of the component parts corresponding to similar parts shown in FIG. 1 and described above. Accordingly, the input signal voltages $e_1$ and $e_2$ are applied respectively between the terminals 1 and 3 and the terminals 3 and 5 with a potentiometer 6 being adapted to establish a condition of balance within the input circuit so that the voltage $e$ substantially disappears in a condition of balance and appears only upon a change in one of the voltages $e_1$ or $e_2$ causing an unbalanced condition.

With constant voltages applied to the terminals 1, 3 and 5, and the potentiometer 6 in a proper position, the system is at rest and the input circuit may be said to be in a balanced condition. However, upon a variation of either of the voltages $e_1$ or $e_2$, an error voltage $e$ is provided which is applied to the moving contact of a suitable modulator which in the arrangement of FIG. 2 takes the form of a double pole single throw vibratory switch 20 which may be energized by a coil 21. The center tap of the primary winding 22 of an input transformer 23 is connected to the movable contactor of the potentiometer 6 so that the modulator 20 functions to alternatively and oppositely apply the error voltage $e$ to the ends of the primary winding 22. The result is that an alternating current wave appears across the secondary winding 24 having an amplitude and phase corresponding to the magnitude and polarity of the error voltage $e$.

A smoothing capacitor 25 functions to provide a substantially sine wave alternating current for application to the control electrode of a conventional amplifier electron tube 26. In well known fashion, the control electrode of the electron tube 26 is returned to ground via a grid resistor 27, the cathode is connected to a cathode resistor 28 and bypass condenser 29, and the anode of the electron tube receives an operating voltage via a load resistor 30 from a power supply terminal 31. A decoupling capacitor 32 connected between the anode of the electron tube 26 and ground reference potential bypasses unwanted high frequency components to ground, and the amplified alternating current wave is passed to the grid of a second electron tube 33 via a coupling capacitor 34 and a pair of resistors 35 and 36 which function as a voltage divider. The amplifying electron tube 33 receives its operating potential via a load resistor 39 and is self-biased by means of the cathode resistor 37 and bypass capacitor 38.

The output signal from the anode of the amplifier tube 33 is passed to a gain control network via a coupling capacitor 8 corresponding to that illustrated in FIG. 1. A fixed impedance in the form of a resistor 9 is connected to a junction point 14 at which a common connection between a pair of series connected diodes 10 nd 11 terminates. Each of the diodes 10 and 11 is returned to ground via a capacitor 13A and 13B respectively so as to provide a low impedance path for the amplified signal passing therethrough.

As shown in FIG. 2, a bias voltage may be applied to the diodes 10 and 11 from a suitable source 40 by means of an adjustable resistor 41 to insure that the diodes 10 and 11 operate in a preselected region of their response characteristics. For example, by applying a suitable bias voltage to the diodes 10 and 11, a linear relationship between applied voltage and impedance may be obtained.

As in FIG. 1, the voltage $e_2$ is applied to the series connected diodes 10 and 11 via a resistor 12 so that in accordance with the above described considerations, the impedance presented to the signal passed by the resistor 9 varies as an inverse function of the applied voltage $e_2$ so as to alter the gain of the servo amplifier to maintain the overall loop gain of the servo system constant.

The variably attenuated signal appearing at the junction point 14 may be passed to a third amplifier stage 42 via a coupling capacitor 43. As before, the amplifier stage 42 may receive operating voltage via a load resistor 44 from the terminal 31, the control electrode may be returned to ground via a grid resistor 45, and the cathode may be connected to a cathode resistor 46 which is bypassed by a suitable capacitor 47. The amplified output signal from the electron tube 42 may be passed by a capacitor 48 to successively connected amplifier stages similar to those previously described. In FIG. 2 for convenience, additional amplifier stages have been omitted from the drawing with the connection to the output stages being broken to indicate that additional amplifier stages may be employed if desired. In any event, the amplified output signal appears across a resistor 49 connected between the control grids of a pair of output electron tubes 50 and 51.

The output tubes 50 and 51 function as power amplifiers to drive a primary winding 52 of an output transformer 53. The screen electrodes of the output tubes 50 and 51 are held at fixed potential by means of a resistor 57 with the anodes of the output tubes 50 and 51 receiving operating potential via the center tap of the primary winding 52. A capacitor 58 may be connected across the primary winding 52 to form a resonant circuit at the frequency of the wave generated by the action of the vibratory switch 20.

A secondary winding 54 of the transformer 53 is connected directly to one winding 55 of the two-phase reversible motor 15. As described above in connection with FIG. 1, another winding 56 of the motor 15 receives a wave of reference phase which bears a fixed phase relationship to the wave applied to the energizing coil 21 associated with the vibratory switch 20. The wave applied to the motor winding 55 functions to cause the motor 15 to rotate in a selected direction and to an extent dependent upon the amplitude and phase of the amplified alternating current wave. The motor 15 is linked to the potentiometer 6 via a mechanical linkage 16 so that in response to the error signal $e$, the arrangement of FIG. 2 functions to cause the motor 15 to rotate in a direction which brings the input circuit into a condition of balance in which the position of the contactor on the potentiometer 6 corresponds to the ratio between the voltages $e_1$ and $e_2$. As a result, the mechanical linkage 16 may be extended to position an indicator or to control auxiliary apparatus such as an electrical or digital signal generator by means of which the ratio between the voltages $e_1$ and $e_2$ may be indicated, measured, registered or recorded as desired.

The following list of component values is intended to be by way of example only of a ratio sensing system constructed in accordance with FIG. 2 in which a 60 c.p.s. alternating current wave is applied to the vibratory switch coil 21 and the motor winding 56 with a D.-C. operating voltage of the order of 105–170 volts being applied to the terminal 31. It will be understood that each of the electron tubes contains a heater for elevating the temperature of the cathode to electron emissive temperature which is connected to a suitable power supply source, although the symbols and connections for such heaters have been omitted from FIG. 2 for convenience of illustration.

| | |
|---|---|
| Potentiometer 6 | 5,000 ohms. |
| Resistor 9 | 150,000 ohms. |
| Resistor 12 | 47,000 ohms. |
| Resistors 27, 35, 45 | 1 megohm. |
| Resistors 28, 37, 46, 57 | 4,700 ohms. |
| Resistors 30, 39, 44, 49 | 220,000 ohms. |
| Resistor 36 | 5,600 ohms. |
| Capacitors 8, 34, 43, 48 | .05 microfarad. |
| Capacitor 25 | .005 microfarad. |
| Capacitors 13A, 13B | 10 microfarads. |
| Capacitor 29 | 25 microfarads. |
| Capacitor 32 | .02 microfarad. |
| Capacitors 38, 47 | 30 microfarads. |
| Capacitor 58 | .25 microfarad. |
| Diodes 10 and 11 | Silicon Hughes type HD6005. |
| Electron tubes 26, 33, 42 | Triode section of 12AX7. |
| Electron tubes 50, 51 | Type 6AQ5. |

Although there has been described above a specific arrangement of the invention for measuring the relative magnitudes of two separate applied voltages, it will be appreciated that the invention is not limited to the specific arrangements shown. Accordingly, the invention should be considered to include any variations, modifications or alternative structures falling within the scope of the annexed claims.

What is claimed is:

1. In a system for measuring the ratio between the magnitudes of first and second electrical signals the combination comprising an input circuit for receiving said electrical signals, said input circuit including adjustable balancing means for establishing a condition of balance between said first and second electrical signals, a servo amplifier coupled to said input circuit for receiving an electrical signal from said input circuit when a condition of unbalance exists between said first and second electrical signals, variable attenuator means whose impedance is a function of the current therethrough coupled to said servo amplifier to control the gain thereof, means energizing said variable attenuator means with a current whose magnitude varies in accordance with the variations in magnitude of said second electrical signal to vary the gain of the servo amplifier as a function of the second electrical signal and independently of any variations in magnitude of said first electrical signal, servo positioning means coupling said servo amplifier to said adjustable balancing means for establishing a condition of balance between said first and second electrical signals, and means coupled to said adjustable balancing means for indicating the ratio between said first and second electrical signals.

2. The combination according to claim 1 wherein said variable attenuator means comprises a first fixed impedance and a pair of serially connected diodes whose conductance is varied as a function of said second electrical signal.

3. The combination according to claim 1 comprising biasing means coupled to said variable attenuator means for establishing a particular attenuation range so as to determine the particular functional relationship between servo amplifier gain and applied signal magnitude.

References Cited in the file of this patent

UNITED STATES PATENTS

| | | |
|---|---|---|
| 2,543,469 | Roston | Feb. 27, 1951 |
| 2,547,703 | Hermont | Apr. 3, 1951 |
| 2,715,209 | Williams | Aug. 9, 1955 |
| 2,790,146 | Livingston | Apr. 23, 1957 |
| 2,913,668 | Lide | Nov. 17, 1959 |
| 2,943,268 | Dodge | June 28, 1960 |